US011869357B1

(12) United States Patent
Okezie

(10) Patent No.: US 11,869,357 B1
(45) Date of Patent: Jan. 9, 2024

(54) METHOD AND APPARATUS FOR EXPANDED TRAFFIC WATCH

(71) Applicant: Pathfins C. Okezie, Piscataway, NJ (US)

(72) Inventor: Pathfins C. Okezie, Piscataway, NJ (US)

(*) Notice: Subject to any disclaimer, the term of this patent is extended or adjusted under 35 U.S.C. 154(b) by 0 days.

(21) Appl. No.: 18/209,691

(22) Filed: Jun. 14, 2023

(51) Int. Cl.
| G08G 1/005 | (2006.01) |
| G08B 21/02 | (2006.01) |
| G08G 1/16 | (2006.01) |
| G06F 3/16 | (2006.01) |
| G08B 3/10 | (2006.01) |
| A41D 1/00 | (2018.01) |

(52) U.S. Cl.
CPC ............ *G08G 1/166* (2013.01); *A41D 1/002* (2013.01); *G06F 3/165* (2013.01); *G08B 3/10* (2013.01); *G08B 21/02* (2013.01)

(58) Field of Classification Search
CPC ........ G08G 1/166; A41D 1/002; G06F 3/165; G08B 3/10; G08B 21/02
See application file for complete search history.

(56) References Cited

U.S. PATENT DOCUMENTS

| 5,041,828 A | 8/1991 | Loeven |
| 5,973,618 A | 10/1999 | Ellis |
| 6,437,690 B1 | 8/2002 | Okezie |
| 6,985,827 B2 | 1/2006 | Williams |
| 7,167,104 B2 | 1/2007 | DiPiazza |
| 7,880,601 B2 | 2/2011 | Okezie |
| 8,134,693 B2 | 3/2012 | Ciolli |
| 8,817,100 B2 | 8/2014 | Nerayoff |
| 9,129,540 B2 | 9/2015 | Jones |
| 9,940,524 B2 | 4/2018 | Krishnamoorthy |
| 10,229,588 B2 | 3/2019 | Che |
| 10,347,107 B1 | 7/2019 | Okezie |
| 10,407,853 B1 | 9/2019 | Dunn |
| 10,453,322 B2* | 10/2019 | Kaindl .................... B60Q 1/52 |
| 11,049,380 B2* | 6/2021 | Kaindl ................ B60Q 1/2673 |
| 11,423,749 B2 | 8/2022 | Omata |
| 11,600,153 B1 | 3/2023 | Okezie |
| 11,759,389 B2* | 9/2023 | Stanfield .................. A61F 7/02 601/21 |

(Continued)

FOREIGN PATENT DOCUMENTS

KR 20210030060 A 3/2021

*Primary Examiner* — Sisay Yacob
(74) *Attorney, Agent, or Firm* — Walter J. Tencza, Jr.

(57) ABSTRACT

An apparatus including a garment having a front configured to substantially cover a person's torso, left and right shoulder regions configured to simultaneously substantially cover the person's left and right shoulders, respectively; a first wearable device attached to the front of the garment; and a second wearable device attached to at least one of the shoulder regions of the garment; and wherein each of the first wearable device and the second wearable device includes means for causing an audio alert to be emitted by an audio speaker located on the garment. The apparatus may be further comprised of a third wearable device which is attached to the left shoulder region of the garment; wherein the second wearable device is attached to the right shoulder region of the garment; and wherein the third wearable device includes means for causing an audio alert to be emitted by the audio speaker.

10 Claims, 5 Drawing Sheets

(56) References Cited

U.S. PATENT DOCUMENTS

| | | | |
|---|---|---|---|
| 11,771,151 B2 * | 10/2023 | Walker | A41D 13/01 |
| | | | 315/307 |
| 2004/0083031 A1 | 4/2004 | Okezie | |
| 2004/0145496 A1 | 7/2004 | Ellis | |
| 2006/0097855 A1 | 5/2006 | Turnbull | |
| 2008/0103655 A1 | 5/2008 | Turnbull | |
| 2009/0289443 A1 | 11/2009 | Okezie | |
| 2014/0046800 A1 | 2/2014 | Chen | |
| 2015/0127215 A1 | 5/2015 | Chatterjee | |
| 2015/0160019 A1 | 6/2015 | Biswal | |
| 2015/0258431 A1 | 9/2015 | Stafford | |
| 2015/0351681 A1 | 12/2015 | Lee | |
| 2016/0039424 A1 | 2/2016 | Hong | |
| 2016/0317383 A1 * | 11/2016 | Stanfield | A61H 23/0236 |
| 2017/0155997 A1 | 6/2017 | Boesen | |
| 2017/0188077 A1 | 6/2017 | Cansino | |
| 2017/0323569 A1 | 11/2017 | Willborn | |
| 2018/0279032 A1 | 9/2018 | Boesen | |
| 2019/0035267 A1 | 1/2019 | Balzer | |
| 2019/0370562 A1 | 12/2019 | Yigit | |
| 2020/0111352 A1 | 4/2020 | Openiano | |
| 2020/0130569 A1 | 4/2020 | Lindsey | |
| 2020/0189476 A1 | 6/2020 | Consolacion | |
| 2021/0101483 A1 | 4/2021 | Okezie | |
| 2021/0287512 A1 * | 9/2021 | Kaindl | G08B 7/06 |
| 2022/0132946 A1 * | 5/2022 | Walker | A41D 1/06 |
| | | | 315/307 |
| 2023/0316897 A1 * | 10/2023 | Koga | G08G 1/005 |
| | | | 340/944 |

\* cited by examiner

METHOD AND APPARATUS FOR EXPANDED TRAFFIC WATCH

FIELD OF THE INVENTION

This invention relates to devices and methods concerning traffic monitoring.

BACKGROUND OF THE INVENTION

Motor vehicle related accidents are a leading cause of death for line duty law enforcement officers in the USA. From year 2011 to 2020, hundreds of officers on duty were killed due to motor vehicle related accidents.

SUMMARY OF THE INVENTION

In at least one embodiment of the present invention, an object is to drastically reduce or eliminate police patrol police officers' deaths related to motor vehicle accidents.

In at least one embodiment of the present invention, an apparatus is provided comprising: a garment having a front configured to substantially cover a person's torso, a left shoulder region configured to simultaneously substantially cover the person's left shoulder, and a right shoulder region configured to substantially cover the person's right shoulder; a first wearable device attached to the front of the garment; and a second wearable device attached to at least one of the shoulder regions of the garment; and wherein each of the first wearable device and the second wearable device includes means for causing an audio alert to be emitted by an audio speaker located on the garment.

The apparatus may be further comprised of a third wearable device which is attached to the left shoulder region of the garment; wherein the second wearable device is attached to the right shoulder region of the garment; and wherein the third wearable device includes means for causing an audio alert to be emitted by an audio speaker located on the garment.

Each of the first wearable device and the second wearable device may be responsive to a dashboard apparatus located on a motor vehicle when the dashboard apparatus approaches the garment within a predetermined distance to cause the audio alert.

In at least one embodiment a fourth wearable device may be attached to the rear of the garment; and the fourth wearable device may include means for causing an audio alert to be emitted by an audio speaker located on the garment.

In at least one embodiment of the present application, the front of the garment includes an indication that the garment belongs to a police officer.

In yet another embodiment of the present application, an apparatus is provided which includes a device configured to be located within a first vehicle and attached to a rear windshield of the first vehicle; and wherein the device is configured to be detected by a dashboard apparatus of a second vehicle, when the second vehicle approaches the first vehicle from behind within a predetermined distance of a vehicle, and to cause the dashboard apparatus to provide an alert that the second vehicle is tail gating too close to the first vehicle.

In another embodiment of the present application a method is provided which may include placing a garment on a person; and wherein the garment has a front configured to substantially cover a person's torso, a left shoulder region configured to simultaneously substantially cover the person's left shoulder, and a right shoulder region configured to substantially cover the person's right shoulder; wherein a first wearable device is attached to the front of the garment; and wherein a second wearable device is attached to at least one of the shoulder regions of the garment; and wherein each of the first wearable device and the second wearable device includes means for causing an audio alert to be emitted by an audio speaker located on the garment.

The garment used in accordance with a method of the present invention may include third and fourth wearable devices as previously described. Generally, the garment, in accordance with a method of the present application, may be configured and/or constructed as previously described.

DETAILED DESCRIPTION OF THE DRAWINGS

Figure 1:
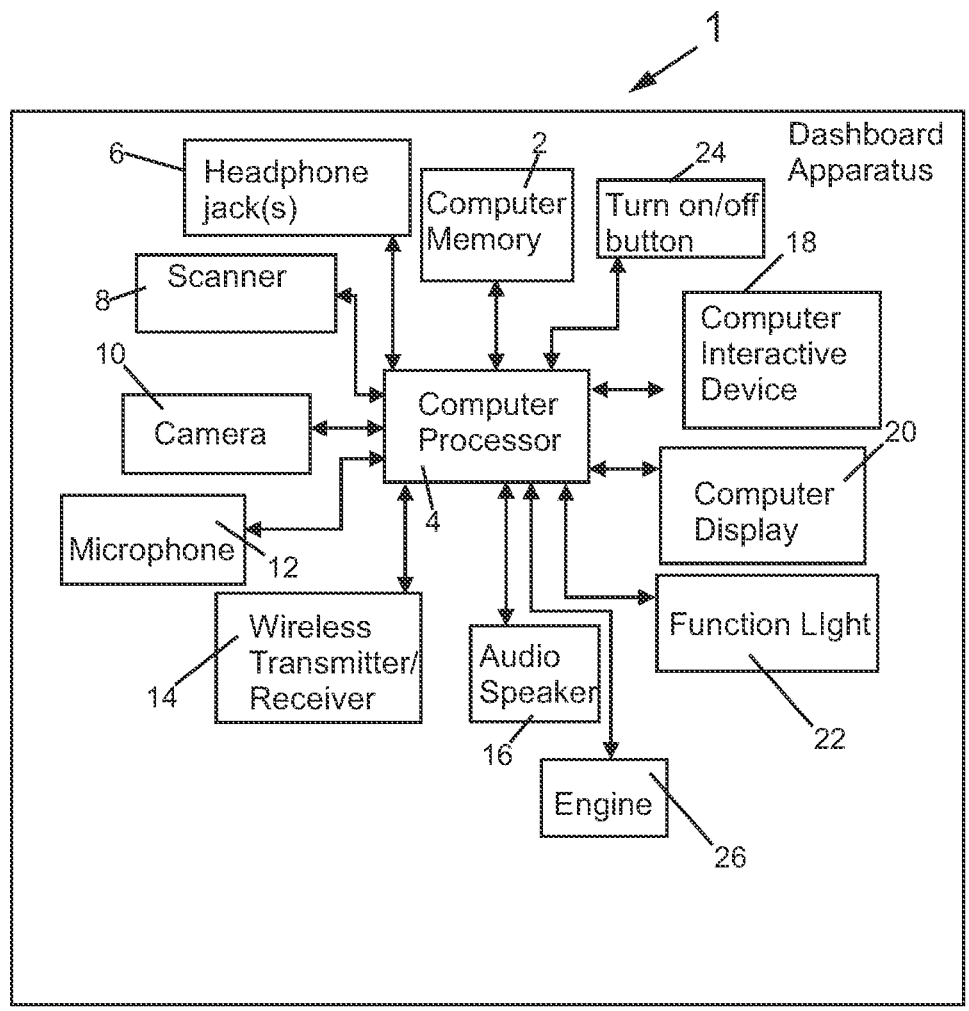
FIG. 1 shows a simplified block diagram of a dashboard apparatus in accordance with an embodiment of the present invention.

FIG. 1 shows a simplified block diagram of a dashboard apparatus 1 in accordance with an embodiment of the present invention.

The dashboard apparatus 1 includes a computer memory 2, a computer processor 4, headphone jack(s) 6, a scanner 8, a camera 10, a microphone 12, a wireless transmitter/receiver 14, an audio speaker 16, a computer interactive device 18, a computer display 20, a function light 22, and a turn on/off button 24. The dashboard apparatus 1 may include or may communicate with a vehicle engine 26.

The wireless transmitter/receiver 14 may be configured to communicate with a wireless or cordless earphone or headphone.

The dashboard apparatus 1 may be located on a dashboard of a vehicle such as an automobile, typically with the exception of engine 26.

The dashboard apparatus 1 may have all the features, functions and characteristics of the dashboard apparatus 1, referred to and described with respect to FIG. 1 of U.S. Pat. No. 11,610,483 B1, issued Mar. 21, 2023, inventor and applicant Pathfins C. Okezie, which is incorporated by reference herein. The dashboard apparatus 1 of the present application typically has additional features beyond what is disclosed in U.S. Pat. No. 11,610,483.

Figure 2A:
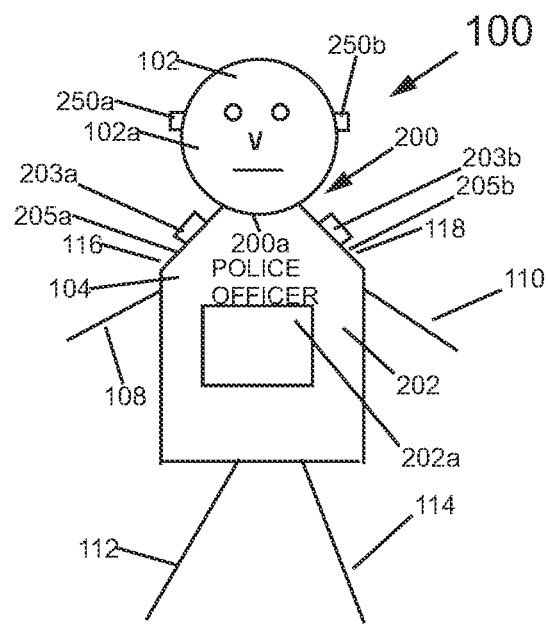
FIG. 2A is a simplified front view of a police officer with clothing including a plurality of removable wearable devices.
Figure 2B:
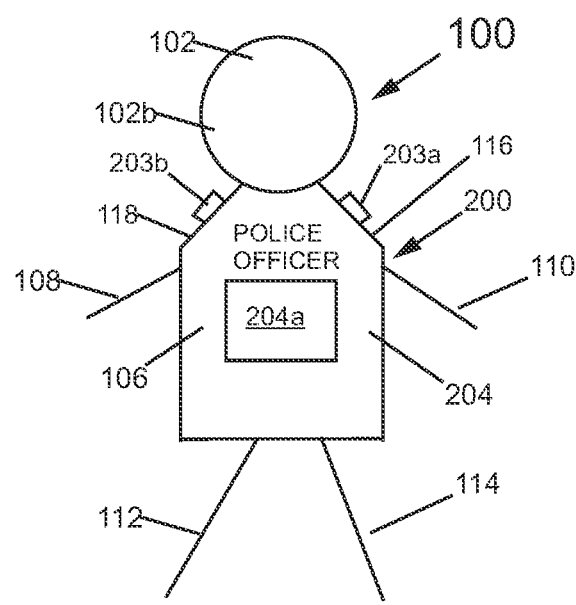
FIG. 2B is a simplified rear view of a police officer with clothing including a plurality of removable wearable devices.

For example, the dashboard apparatus 1 of the present application, may be configured to detect first device 202a and second device 204a, wherein both the first and second devices are worn by a police officer 100 shown in FIGS. 2A-2B.

FIGS. 2A-2B are simplified front and rear views of the police officer 100. The police officer 100 has a head 102, with a front or face 102*a*, and a rear 102*b*. The police officer 100 also has a front body portion 104 shown in FIG. 2A, which may include fronts and/or front exteriors of torso, neck, chest, stomach, and a rear body portion 106 shown in FIG. 2B, which may include rears and/or rear exteriors of torso, back, and rear end. The police officer 100 also has arms 108 and 110, legs 112 and 114, and shoulders 116 and 118.

The police officer 100 is shown wearing a poncho style piece of clothing 200, which has a front 202 and a rear 204. The clothing 200 may also be a sweater, shirt, or other type of clothing which typically has a front for covering the front of police officer 100, including at least a portion of the police officer's chest area, and a rear for covering at least a portion of the back of the police officer. The clothing 200 may have an opening 200*a*, such as an opening or slit of a poncho, for inserting a person's head 102 through the opening 200*a* in order to put the clothing 200 on.

The clothing 200 has first device 202*a* fixed to the front 202 of the clothing 200 and a second device 204*a* fixed to the back of the clothing 200. The first device 202*a* and the second device 204 may be identical, and may be removable from the clothing 200, such as by Velcro (trademarked) and/or hooks and/or loops located on the first device 202*a* and the second device 204*a* and mating loops and/or hooks located on the front 202 and the back 204, respectively, of the clothing 200. The devices 202*a* and 204*a* may also be attached by pins to the clothing 200, so devices 202*a* and 204*a* can be removed from clothing 200.

The computer memory 2 of the dashboard apparatus 1 includes computer software which is typically executed by the computer processor 4 to sense the devices 202*a* and 204*a*, and to produce an alert or warning signal on the dashboard apparatus 1, such as an audio signal played through audio speaker 16 or a visual signal displayed on computer display 20.

In addition, the computer memory 2 of the dashboard apparatus 1 includes computer software which is typically executed by the computer processor 4 to sense the devices 203*a* and 203*b*, and to produce an alert or warning signal on the dashboard apparatus 1, such as an audio signal played through audio speaker 16 or a visual signal displayed on computer display 20.

The devices 203*a* and 203*b* may be identical, and may be removable from the clothing 200, such as by Velcro (trademarked) and/or hooks and/or loops located on the device 203*a* and the device 203*b* and mating loops and/or hooks located on the corresponding shoulder areas 205*a* and 205*b* of the clothing 200. The devices 203*a* and 203*b* may also be attached by pins to the clothing 200, so devices 203*a* and 203*b* can be removed from clothing 200, however, Velcro (trademarked) or mating hooks and/or loops sections are preferred to keep the devices 203*a*, 203*b*, as well as 202*a* and 204*a* from moving or jiggling with respect to the clothing 200.

Any of the devices 203*a*, 203*b*, 202*a* and/or 204*a* may include an adhesive that allows any of these devices to be removably attached to any surface.

The devices 203*a*, 203*b*, 202*a*, and 204*a* may be provided together in a kit and reserved and/or marketed directly to law officer agencies, for their officers.

The devices 203*a*, 203*b*, 202*a*, and 204*a* may be attached to clothing 200 by a circular base. Each of the devices 203*a*, 203*b*, 202*a*, and 204*a* may include multiple sensors, or other devices which can be detected by the dashboard apparatus 1.

In operation, in at least one embodiment, whenever a foot patrol officer is on duty and as an approaching vehicle, including dashboard apparatus 1 is within range of the police officer and the vehicle's dashboard apparatus 1 scans and/or otherwise detects any of the four devices 203*a*, 203*b*, 202*a*, and/or 204*a* worn by the police officer on clothing 200, a pre-recorded audio message, stored in computer memory 2, may be played through audio speaker 16 by computer processor 4, to say something like: "please watch out for the foot patrol officer/s ahead to prevent any accident".

Figure 3:
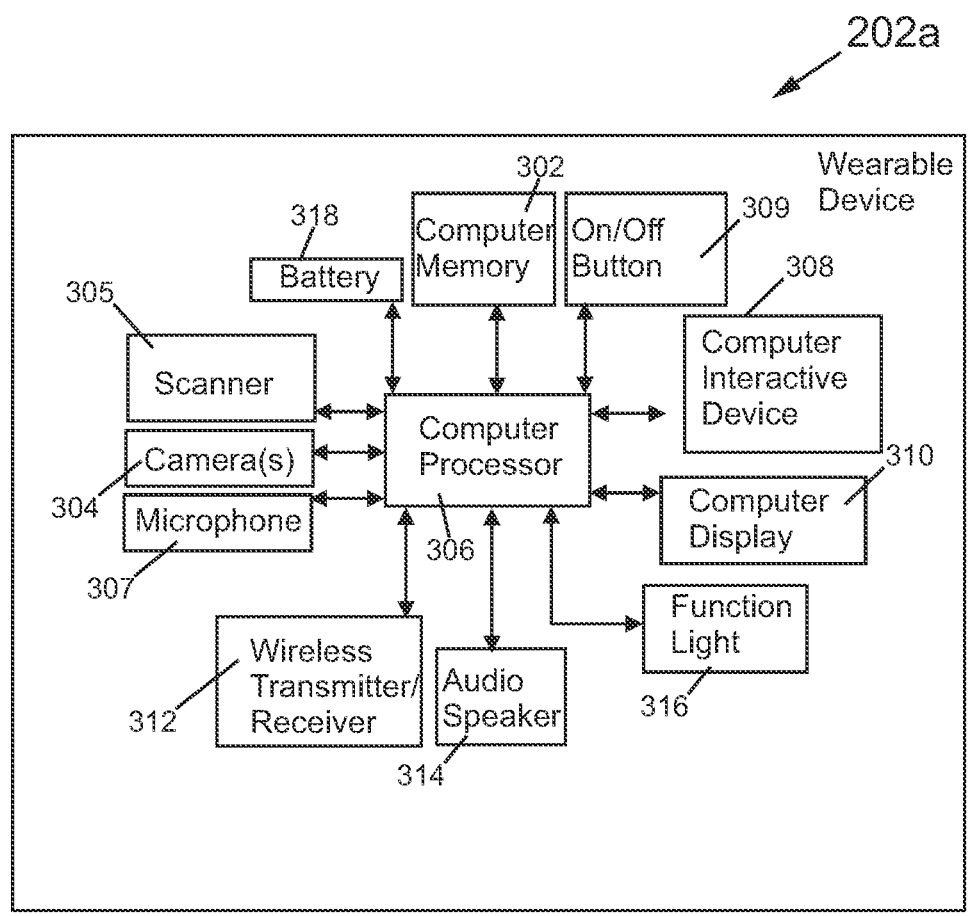
FIG. 3 shows a simplified block diagram of a wearable device.

In at least one embodiment, each of devices 203*a*, 203*b*, 202*a*, and 204*a* may be called a "wearable device". FIG. 3 shows a simplified block diagram of wearable device 202*a*, wherein each of the other wearable device 203*b*, 202*a*, and 204*a* may be identical to the wearable device 202*a*.

The wearable device 202*a* may include computer memory 302, camera 304, scanner 305, computer processor 306, a microphone 307, computer interactive device 308, computer display 310, wireless transmitter/receiver 312, audio speaker 314, function light 316, and battery 318. All of the components shown in FIG. 3, other than computer processor 306, are typically configured to communicate with and/or be controlled by computer processor 306.

In at least one embodiment, at approximately the same time or simultaneously, that the alert or warning signal is played on audio speaker 16 of dashboard apparatus 1, the computer memory 302 of the device 202*a* (as well as deices 204*a*, 203*a*, and 203*b*) may cause a pre-recorded audio warning message to be played through audio speaker 314, as implemented by computer processor 306, and on corresponding audio speakers of devices 204*a*, 203*a*, and 203*b*. The audio message played through the speaker 314, and identical or substantially similar speakers of 204*a*, 203*a*, and 203*b*, may state to officer 100 wearing these: "please watch out for the oncoming vehicle". The audio message may specify what direction the oncoming vehicle is coming from such as from your "left side", "right side", "front", or "back".

Each of the four devices 202*a*, 204*a*, 203*a*, and 203*b* may have all the features and characteristics of the wrist band device 100 shown and described, with respect to FIG. 2 of U.S. Pat. No. 11,610,483, which is incorporated by reference herein. The four devices 202*a*, 204*a*, 203*a*, and 203*b* may also include additional characteristics and features as disclosed in the present application.

Figure 4:
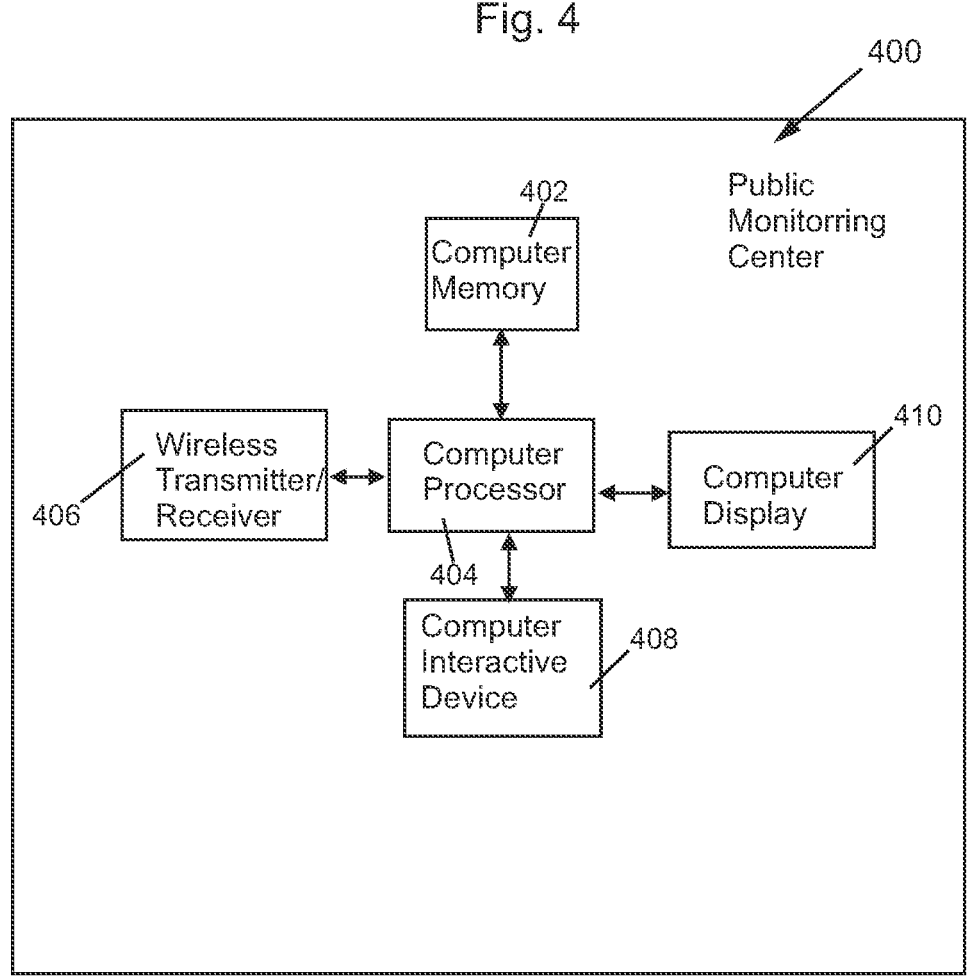
FIG. 4 shows a simplified block diagram of a monitoring station.

Each of the devices 202*a*, 204*a*, 203*a*, and 203*b* may include a first name, middle initial, and last name of the police officer who is assigned these devices, and this may be stored in computer memory 302. The information regarding the first name, middle initial, and last name of the police officer, or other identifying information concerning the officer such as badge number may be reported to public monitoring center 400 shown in FIG. 4, such as via wireless transmitter/receiver 312, as programmed by computer software stored in computer memory 302, and implemented by computer processor 306, and as transmitted to wireless transmitter/receiver 406.

The public monitoring center 400 includes computer memory 402, computer processor 404, wireless transmitter/receiver 406, computer interactive device 408, and computer display 410.

Each of the devices 202*a*, 204*a*, 203*a*, and 203*b* may include a model number/serial number of the product (such as a nine-digit serial number) in case there is a recall of the product/s or device by the government authority.

In at least one embodiment the dashboard apparatus 1 may be configured so that the computer processor 4 can detect whenever the scanner 8 or camera 10 malfunctions, and the computer memory 2 may be programmed with computer software, to be implemented by the computer processor 4 to cause the function light 22 to flash red or cause the scanner 8 or camera, (whichever is malfunctioning) to flash red to alert the vehicle operator to replace the non-functioning scanner 8 and/or camera 10 on the dashboard apparatus 1.

In at least one embodiment, some of the common components of the wearable devices 202a, 204a, 203a, and 203b may be combined and/or shared to save on cost.

The officer 100 is also shown wearing wireless earphones 250a and 250b shown in FIG. 2A. The earphones 250a and 250b may be described as being part of or as being configured to communicate wirelessly with one or more of the wearable devices 202a, 204a, 203a, and/or 203b, such as through wireless transmitter/receiver 312, and computer processor 306.

The four devices 202a, 204a, 203a, and 203b are preferably covered with a waterproof covering.

The battery 318 of the wearable device 202a may have a three level indicator charging system, which, as shown on the function light 316 or as part of the battery 318, wherein for the first level the function light 316, or a light which is part of battery 318, lights evergreen for full charged, wherein for the second level the function light 316 or appropriate light lights yellow for still functionally active and still able to give and receive signals to and from the vehicle's dashboard apparatus 1 and the third level means function light 316 or other appropriate light, lights red.

Whenever the battery 318 gets to the red third level, this means that the battery 318 has run out of power and the computer processor 306 senses that the battery 318 is out of power, and provides an audio alert signal through audio speaker 314 and/or a visual alert signal through function light 316 to alert the wearer that it is time to recharge or replace the battery 318 or other charging devices.

As soon as the approaching vehicle dashboard apparatus 1 is within a predetermined range, typically set within the computer memory 2, such as a range of about twenty to thirty yards away from any one of the wearable devices 202a, 204a, 203a, and 203b, the dashboard apparatus 1 is programmed to detect any of the wearable devices 202a, 204a, 203a, and 203b, such as through wireless transmitter/receiver 14, camera 10, and/or scanner 8.

When the dashboard apparatus 1 detects any of wearable device 202a, 204a, 203a, and/or 203b, the computer processor 4 implements computer software stored in computer memory 2 to cause a pre-recorded audio message to be emitted from the audio speaker 16, such as: "please watch out for the foot patrol police officer on duty ahead". At the same time or simultaneously, as soon as the approaching vehicle dashboard apparatus 1 detects any of the four devices 202a, 204a, 203a, or 203b, a pre-recorded message will be activated by the computer processor 306 to say some like this to the police patrol officer via audio speaker 314: "please watch out for the oncoming vehicle, get out of the way to prevent any accident". This audio message may be activated as a result of the computer processor 306 of the wearable device detecting the dashboard apparatus 1, such as via scanner 305, camera 304, and/or wireless transmitter/receiver 312, or as a result of a command from the dashboard apparatus 1 to any of the wearable devices 202a, 204a, 203a, and/or 203b, as received through wireless transmitters 14 and 312.

The four devices 202a, 204a, 203a, and 203b may perform at least similar or identical functions as the wrist band 100, described with reference to FIG. 2 in U.S. Pat. No. 11,610,483, to Okezie, which is incorporated herein by reference; and additional functions in accordance with the present application.

Many times, a foot patrol police officer is in a stationary position regulating or controlling the movement of traffic on a road or highway. Sometimes, while the foot patrol police officer is in this stationary position, a civilian vehicle effectively sneaks up on the police officer, often from a blind side, such as from the back or the left/right side of the police officer, while the police officer's vision is focused straight ahead, and this is how a police office may be hit by a civilian automobile of motor vehicle. The wearable devices 202a, 204a, 203a, and 203b prevent or substantially inhibit this from happening by providing detecting of an approaching vehicle from the front (by 202a focused forwards), from the back (by 204a focused backwards), from the officer's left side (by 203b focused leftwards), and from the officer's right side (by 203a focused rightwards). With the technology of the present invention civilian vehicles can no longer sneak up on a foot patrol police officer while he or she is on duty and cause an accident. The foot patrol police officer now has the tools/technology that gives him/her heads up of any approaching vehicle/s to the foot patrol police officer while on duty.

On the front 202 of the clothing 200, near the upper chest the words "POLICE OFFICER" may be shown in capital letters as shown in FIG. 2B. The words "POLICE OFFICER" may also be marked on the back 204 of the clothing as shown in FIG. 2B.

In at least one embodiment, non-police officers may wear an apparatus identical to the apparatus or clothing 200, and related components, without the police officer designations on the clothing, and without programming to indicate that a police officer is wearing the clothing 200. For example, pedestrians, cyclists, electronic bike riders, scooter riders, and motorcyclists mean wear the clothing 200 or a modified version, not indicating "police" and not programmed to indicate a police officer is wearing clothing 200.

Similarly, other road users such as pedestrians, cyclists/e bike rides, scooter rides, motorcycle riders, may use clothing 200 or something substantially similar. In at least one embodiment, the clothing 200 may only include devices 202a and 204a and not devices 203a and 203b.

The devices 202a, 204a, 203a, and 203b may all be equipped with blue tooth.

To prevent theft of the clothing 200 and/or the devices 202a, 204a, 203a, and 203b, whenever any of these devices is reported to be stolen the real owner of the clothing and/or the devices 202a, 204a, 203a, and 203b can go to a website and enter a first name, date of purchase or subscription and serial number or model number of the clothing 200 and/or the devices 202a, 204a, 203a, and/or 203b and hit the deactivate button and/or on/off button 309 shown in FIG. 3, and subsequently the said device, such as any one or more of devices 202a, 204a, 203a, and/or 203b will be deactivated and the particular device of 202a, 204a, 203a, and/or 203b, cannot be used by anyone until the device is reactivated. In at least one embodiment, turning just one of the devices 202a, 204a, 203a, or 203b off will cause all four devices to turn off, such as by communication from one of the devices 202a, 204a, 203a, and/or 203b to the other devices through wireless transmitter/receiver 312 to other wireless transmitter/receivers 312 of the other devices 202a, 204a, 203a, and/or 203b. Typically, there would be computer software in computer memory 302 which interprets a turn off signal received from another of the devices 202a, 204a, 203a, and/or 203b.

Figure 5:
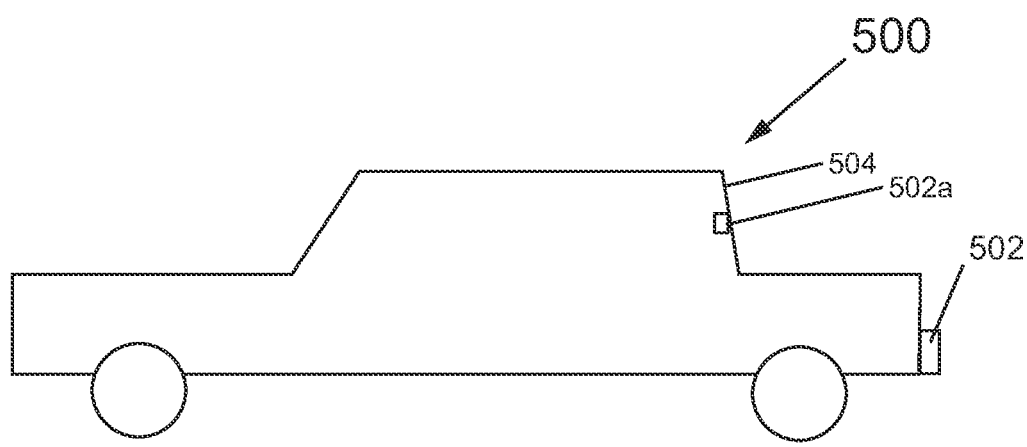
FIG. 5 shows a simplified diagram of an automobile vehicle with a rear bumper 502 that may be a standard automobile rear bumper, with a device attached to help provide a tail gating alert signal.

At least one further embodiment of the present invention provides a tail gating alert system, apparatus and/or method. FIG. 5 shows a simplified diagram of an automobile vehicle 500 with a rear bumper 502 that may be a standard automobile rear bumper. Fixed to the rear bumper 502 may be a device 502a that may be substantially similar to or identical to the device 202a shown and described with reference to FIG. 3.

In operation, the device 502a may send out a signal, such as via wireless transmitter/receiver 312, which may be received at a dashboard apparatus 1 of a further vehicle, different from the vehicle 500. The signal may indicate that the further vehicle, coming up from behind the vehicle 500, is too close to the vehicle 500. The dashboard apparatus 1 on the further vehicle coming up from behind vehicle 500 may be programmed, by software in the computer memory 2, to emit an audio warning or message through speaker 16 to indicate that the further vehicle is too close to vehicle 500 and should stop tail gating. The warning may be emitted on the further vehicle when the further vehicle is within three feet, or some predetermined distance stored in computer memory 2 of the further vehicle. The message may state: "Please, remember, tail gating is not allowed or tolerated on our roads and highways to prevent tail gaiting accident/s and may result in injuries to you or to the occupants of the vehicle or motorcycle ahead of you." If tailgating continues, the dashboard apparatus 1 may be programmed to alert nearby public monitoring center 400 which may be a police station monitoring center. This technology is designed to reduce the total number of fender bender accidents.

The device 502a, may be programmed to be sensitive to tampering, so that a message is emitted by the audio speaker 314, as caused by the computer processor 306, as programmed by software stored in computer memory 302 when physical tampering with the device 502a, such as attempts to remove device 502a from the bumper 502, occur. The device 502a may be programmed so that if it is moved beyond a certain distance from a dashboard apparatus 1 of the same vehicle, the device 502a will automatically shut down, and be inoperable.

In at least one embodiment, the rear bumper or fender device 502a is programmed to communicate, typically wirelessly with the dashboard apparatus 1 of the vehicle on which it is located, as well as with any other dashboard apparatus 1 of any other vehicle.

In at least one embodiment, when the device 502a, such as at the back of a car 500 or a truck or other vehicle, is tampered with, a red light will be lit, such as for function light 22 shown in FIG. 1 on dashboard apparatus 1 of the same vehicle 500. This will alert the vehicle operator of the dashboard apparatus 1 of the same vehicle that the device 502a has been tampered with.

In at least one embodiment, the bumper or fender device 502a is preferably a waterproof or water-resistant device.

In at least one embodiment, for sedan vehicles, minivans, buses and other types of vehicles that have a rear or back windshield, the fender bender sensor/device 502a is configured to be attached to the inside of the rear/back windshield 504. The attached fender bender sensor/device 502a attached to the vehicle rear/back windshield 504 should be facing the road/highway behind the vehicle 500 so that an approaching further vehicle (approaching from behind vehicle 500 of FIG. 5), having a dashboard apparatus 1 should be able to scan and/or otherwise detect the fender bender sensor/device 502a attached to the vehicle 500, whenever the approaching further vehicle drives within a predetermined distance of the vehicle 500. The predetermined distance is typically stored in the dashboard apparatus 1 of the approaching further vehicle and/or in the device 502a on the vehicle 500. The predetermined distance may be within five feet of the rear bumper 502 of the vehicle 500.

If the approaching further vehicle gets within the predetermined distance, a pre-recorded. audio message is programmed to be emitted on the audio speaker 16 of the dashboard apparatus 1 of the approaching further vehicle, such as "tail gating the vehicle ahead of your vehicle at any time is against the law of the state, you should always maintain a distance of a full car length to the vehicle ahead of you to prevent tail gaiting accident. however, if you continue to tail gate the vehicle ahead of you, I will alert a near police officer to pull you over and issue a citation for tail gating violation".

For small and big trucks that do not have rear/back windshield, the fender bender sensor/device can be attached at the back door of the truck or any part of the rear/back of the vehicle that can easily be scanned and/or detected by the dashboard apparatus of the approaching further vehicle.

In addition, in at least one embodiment, whenever the vehicle 500 backs up or attempts to back up or attempts to back up within a pre-determined distance of a vehicle behind vehicle 500, the dashboard apparatus is programmed to provide an audio and/or visual warning, such as via audio speaker 16 and/or computer display 20 of the dashboard apparatus 1 of the vehicle 500, that the vehicle 500 is backing up too close to a vehicle located behind it.

In at least one embodiment, the scanner 8, camera 10, and/or wireless transmitter/receiver 14 are configured to be capable and/or have enough power, sensitivity, and/or accuracy to scan or sense through windshield glass of windshield 504, where the device 502a is typically attached to the inside of the windshield 504, shown in FIG. 5. In the case of the scanner 8 and/or the wireless transmitter/receiver, of the dashboard apparatus 1, these components are preferably powerful/sensitive enough to sense the device 502a despite the presence of obstructions such as clothing or objects that may be attached to the rear of the car 500.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
    a garment having a front configured to substantially cover a person's torso, a left shoulder region configured to simultaneously substantially cover the person's left shoulder, and a right shoulder region configured to substantially cover the person's right shoulder;
    a first wearable device attached to the front of the garment; and
    a second wearable device attached to at least one of the shoulder regions of the garment; and
    wherein each of the first wearable device and the second wearable device includes means for causing an audio alert to be emitted by an audio speaker located on the garment; and
    wherein each of the first wearable device and the second wearable device is responsive to a dashboard apparatus located on a motor vehicle when the dashboard apparatus approaches the garment within a predetermined distance to cause the audio alert.

2. The apparatus of claim 1 further comprising
a third wearable device which is attached to the left shoulder region of the garment; and
wherein the second wearable device is attached to the right shoulder region of the garment; and
wherein the third wearable device includes means for causing an audio alert to be emitted by an audio speaker located on the garment.

3. The apparatus of claim 1 further comprising
a third wearable device which is attached to the rear of the garment; and
wherein the third wearable device includes means for causing an audio alert to be emitted by an audio speaker located on the garment.

4. The apparatus of claim 2 further comprising
a fourth wearable device which is attached to the rear of the garment; and
wherein the fourth wearable device includes means for causing an audio alert to be emitted by an audio speaker located on the garment.

5. The apparatus of claim 1 wherein
the front of the garment includes an indication that the garment belongs to a police officer.

6. A method comprising:
placing a garment on a person; and
wherein the garment has a front configured to substantially cover a person's torso, a left shoulder region configured to simultaneously substantially cover the person's left shoulder, and a right shoulder region configured to substantially cover the person's right shoulder;
wherein a first wearable device is attached to the front of the garment; and
wherein a second wearable device is attached to at least one of the shoulder regions of the garment; and
wherein each of the first wearable device and the second wearable device includes means for causing an audio alert to be emitted by an audio speaker located on the garment; and
wherein each of the first wearable device and the second wearable device is responsive to a dashboard apparatus located on a motor vehicle when the dashboard apparatus approaches the garment within a predetermined distance to cause the audio alert.

7. The method of claim 6 wherein
a third wearable device is attached to the left shoulder region of the garment; and
wherein the second wearable device is attached to the right shoulder region of the garment; and
wherein the third wearable device includes means for causing an audio alert to be emitted by an audio speaker located on the garment.

8. The method of claim 6 wherein
a third wearable device is attached to the rear of the garment; and
wherein the third wearable device includes means for causing an audio alert to be emitted by an audio speaker located on the garment.

9. The method of claim 7 wherein
a fourth wearable device is attached to the rear of the garment; and
wherein the fourth wearable device includes means for causing an audio alert to be emitted by an audio speaker located on the garment.

10. The method of claim 6 wherein
the front of the garment includes an indication that the garment belongs to a police officer.

* * * * *